United States Patent [19]

Nakai

[11] Patent Number: 5,323,096
[45] Date of Patent: Jun. 21, 1994

[54] SERVOMOTOR CONTROL DEVICE USING SERVOMATOR ROTATION SPEED EXTRAPOLATION

[75] Inventor: Toshifumi Nakai, Ichihara, Japan

[73] Assignee: Sharp Kabushiki Kaisha, Osaka, Japan

[21] Appl. No.: 915,677

[22] Filed: Jul. 21, 1992

[30] Foreign Application Priority Data

Jul. 23, 1991 [JP] Japan .................. 3-182671

[51] Int. Cl.$^5$ ............................................. G05B 6/02
[52] U.S. Cl. ................... 318/603; 318/621; 388/902
[58] Field of Search ............. 388/902; 318/600, 603, 318/620, 621

[56] References Cited

U.S. PATENT DOCUMENTS

| | | | |
|---|---|---|---|
| 4,563,623 | 1/1986 | Matsuka | 318/813 |
| 4,697,127 | 9/1987 | Stich et al. | 318/561 |
| 4,953,070 | 8/1990 | Yamamoto | 364/176 |
| 5,038,090 | 8/1991 | Kawabata et al. | 318/721 |

FOREIGN PATENT DOCUMENTS 0069469 12/1983 European Pat. Off. .
0403658 12/1990 European Pat. Off. .
1252187 10/1989 Japan .
2133591 7/1984 United Kingdom .

OTHER PUBLICATIONS

IBM Technical Disclosure Bulletin, vol. 32, No. 6B, Nov. 1989, pp. 105-107, Digital Control of Spindle Motor.

Machine Design, vol. 58, No. 28, Nov. 1986, pp. 173-177, New Approach to Speed Control, Joseph Altnether.

Primary Examiner—William M. Shoop, Jr.
Assistant Examiner—Brian Sircus

[57] ABSTRACT

A servomotor control device including a drive pulse generating circuit for generating a pulse signal having a frequency corresponding to an actual frequency of a servomotor, and arithmetic operation unit for outputting a control signal on the basis of the pulse signal for control of the servomotor. The arithmetic operation unit generates the control signal by implementing an extrapolation correction on the basis of preestimated variation of a frequency of the servomotor due to a time delay between a moment when the pulse signal is generated and a moment when the control signal is applied to the servomotor.

3 Claims, 3 Drawing Sheets

SERVOMOTOR CONTROL DEVICE USING SERVOMATOR ROTATION SPEED EXTRAPOLATION

BACKGROUND OF THE INVENTION

1. Field of the Invention

This invention relates to a servomotor control device for controlling the frequency of a servomotor according to information on the actual frequency of the servomotor.

2. Description of the Background Art

To control servomotor in a DAT (digital audio tape recorder), VCR (video cassette recorder), etc., for example, a servomotor for driving a rotating head drum, a servomotor for driving a capstand and a servomotor for driving a tape reel and the like use a signal indicative of the actual frequency of the servomotor. The signal indicative of frequency of a servomotor is a pulse signal which is generated once or more during one revolution of the servomotor by sensing, with a sensor (frequency generator), one or more magnetic poles mounted on a rotating mechanism. From an interval of such pulse signal, a frequency is calculated. This measured frequency is compared with a target frequency, and the difference between them is used to generate a control signal for the servomotor.

For such control signal, in the case of an AC motor, an analog waveform signal produced by a PWM (pulse width modulation) circuit, for example, is used, and in the case of a DC motor an analog voltage signal produced by a PWM circuit or a D-A (digital to analog) converter or the like, is used.

A conventional servomotor control device as described above, in which a frequency is calculated from an interval of a pulse signal received from a frequency generator and compared a with a target frequency to generate a servomotor control signal, has a disadvantage described below.

Because of a time delay between the moment when the pulse signal is supplied from the frequency generator and the moment when the servomotor control signal is calculated, which occurs whether the above-mentioned calculation is executed by hardware or software, it is impossible to output, at the moment when the pulse signal is received, a control signal adapted for that moment. Generally, the time delay can be made a small value if servo control is implemented by hardware. In servo control by software, because the arithmetic operations include time-consuming operations such as multiplication in addition to addition and subtraction, the time delay becomes a considerable value.

Therefore, though the output control signal is the optimum value for the moment when the pulse signal is obtained, it differs from the optimum value for the moment when the control signal is outputted. As a result, problems such as a lowering of response speed of a servo control system and ringing occur such that the motor speed does not converge and its amplitude oscillates in progression, making it difficult for the servo system to stay in a stable condition.

SUMMARY OF THE INVENTION

It is therefore an object of the present invention to provide a servomotor control device which has a quick response and which prevents ringing of a servomotor.

According to the present invention, there is provided a servomotor control device including a pulse generator for generating a pulse signal having a frequency corresponding to an actual frequency of a servomotor and an arithmetic operation unit for outputting a control signal on the basis of the pulse signal to control the servomotor, wherein the arithmetic operation unit generates the control signal by implementing an extrapolation correction on the basis of a preestimated variation of a frequency of the servomotor due to a time delay between a moment when the pulse signal is generated and a moment when the servomotor control signal is applied to the servomotor.

It is possible to preestimate a time delay between the moment when a pulse signal is generated and the moment when a servomotor control signal is outputted because the period of time required for arithmetic operation is substantially constant as long as the same arithmetic operation is performed. The variation of the servomotor rotation speed for this delay time is preestimated by extrapolative calculation. A control signal according to the preestimated speed is outputted. Thus, the control signal is outputted in real time, whereby the motor's response speed becomes high enough, and therefore, servo control can be performed stably without the occurrence of ringing of a servomotor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Further objects and advantages of the present invention will be apparent from the following description of the preferred embodiment of the invention as illustrated in the accompanying drawings, which are given by way of illustration only and thus are not limitative of the present invention, and wherein:

BRIEF DESCRIPTION OF THE PREFERRED EMBODIMENT

An embodiment of the present invention will now be described with reference to the drawings.

Figure 2:
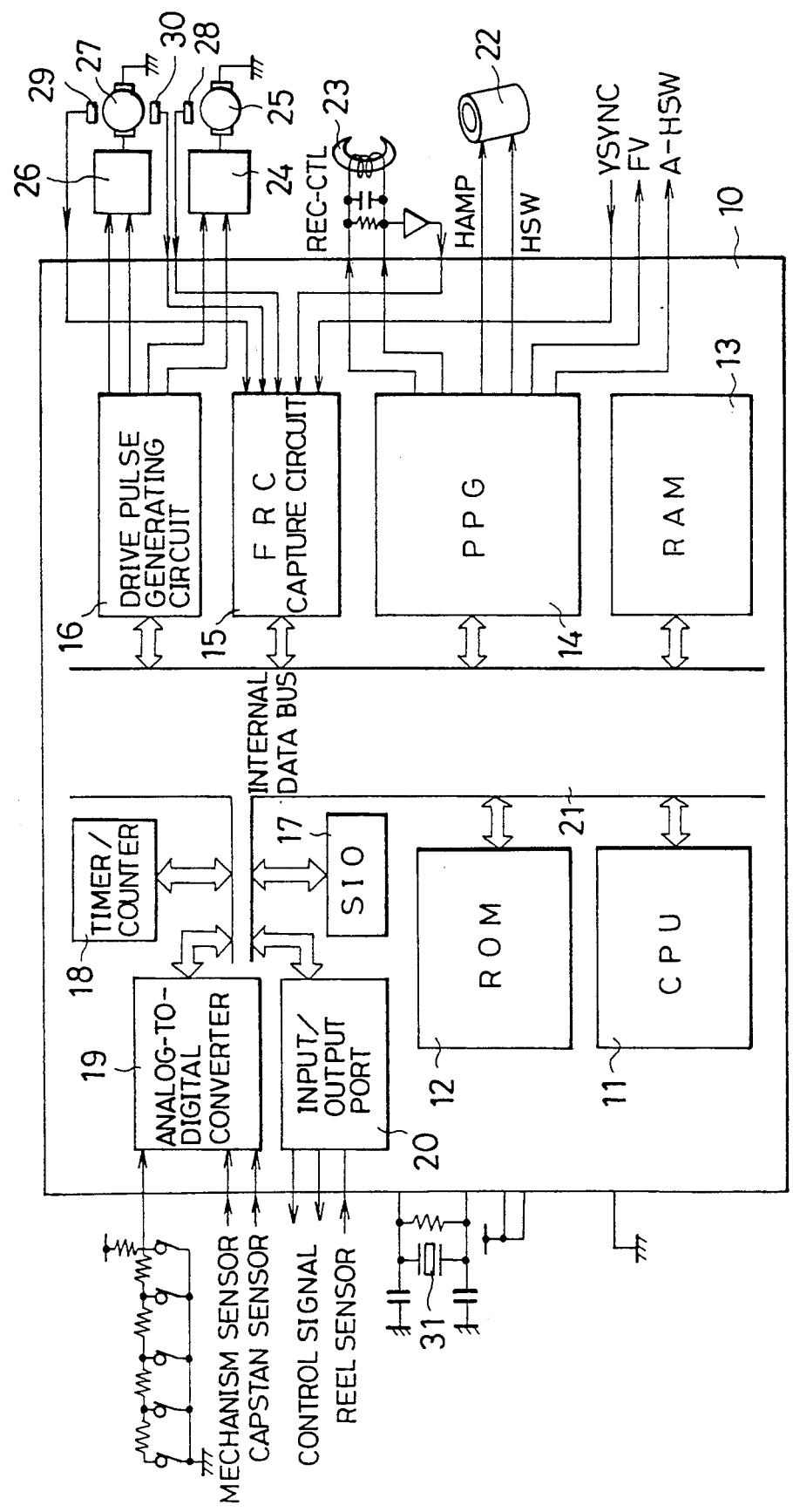
FIG. 2 is a block diagram schematically showing a construction of the servomotor control device of the embodiment of FIG. 1.

FIG. 2 is a block diagram schematically showing a construction of a servomotor control device of a VCR according to an embodiment of the present invention.

In FIG. 2, reference numeral 10 denotes a microcomputer for servo control. This microcomputer 10 includes a CPU 11, a ROM 12, a RAM 13, a PPG (programmable pattern generator) 14, an FRC (free run counter) capture circuit 15, a drive pulse generating circuit 16, an SIO (serial interface unit) 17 for input/output conversion of serial data, a timer/counter 18, an analog-to-digital converter 19, and a general-purpose input/output port 20. Those components are interconnected through an internal bus 21.

Connected to this microcomputer 10 are a VCR rotating head drum 22, a CTL head (control head) 23, a capstan drive motor 25 through a drive circuit 24, a rotating head drum drive motor 27 through a drive circuit 26, a capstan frequency generator 28, a frequency generator 29 of the rotating head drum 22, a pulse generator 30 of the rotating head drum 22, and a quartz oscillator 31.

The PPG 14 generates various signal patterns, including a head switching pulse HSW for the rotating head drum 22, a control signal HAMP for a head amplifier (not shown), a record control signal REC-CTL for the CTL head 23, a false vertical synchronizing signal FV, and an audio head switching pulse A-HSW. Since the PPG 14 is not the main feature of the present invention, its detailed explanation will not be given.

The FRC capture circuit 15, having a free run counter as a main component, latches a capstan frequency pulse C-FG received from the capstan frequency generator 28, a drum frequency pulse D-FG received from the frequency generator 29 of the rotating head drum 22, a drum pulse D-PG received from the pulse generator 30 of the rotating head drum 22, and a reproduction control signal PL-CTL received from the CTL head 23, in synchronism with the timing of a pulse edge of a vertical synchronizing signal VSYNC. The actual rotational position of each motor is represented by count values of the free run counter, and it is supplied to the CPU 11. The above-mentioned frequency generators 28 and 29 are used for detecting the actual speeds of the capstan drive motor 25 and the rotating head drum drive motor 27 respectively. The CPU 11 performs arithmetic operations by using count values of the free run counter supplied from the FRC capture circuit 15, and outputs motor control signals to the drive pulse generating circuit 16.

The drive pulse generating circuit 16 is a duty control circuit. According to control quantities supplied from the CPU 11, it produces PWM signals for controlling the frequencies and the phases of the capstan drive motor 25 and the rotating head drum drive motor 27, and outputs the signals to the drive circuits 24 and 25 respectively, whereby the capstan drive motor 25 and the rotating head drum motor 27 are servo-controlled.

The analog-to-digital converter 19 is provided for inputting data used for adjustment and signals from a capstan sensor and a mechanism sensor.

The general-purpose input/output port 20 receives a signal from a reel sensor, and outputs a capstan control signal and a mechanism control signal.

Figure 1:
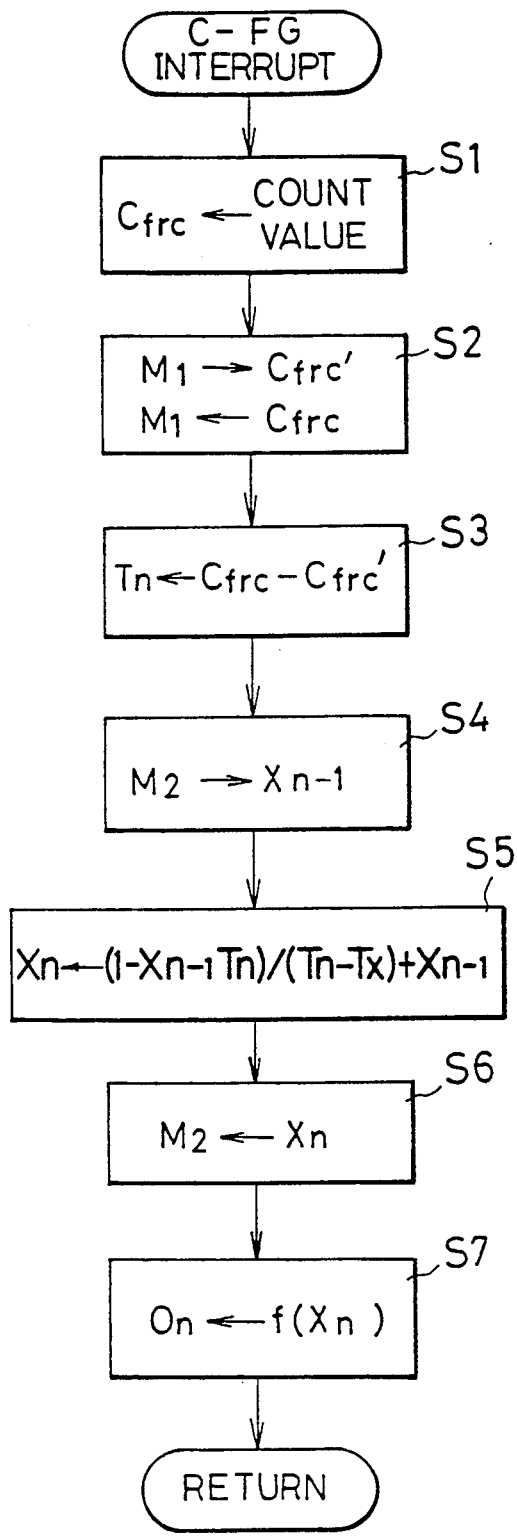
FIG. 1 is a flowchart of an interruption routine in an embodiment of the present invention.

FIG. 1 is a flowchart of an interrupt routine that CPU 11 executes in calculating control quantities for the capstan drive motor 25. This interruption routine is triggered by a rising edge of the capstan frequency pulse C-FG received from the frequency generator 28.

At step S1, the FRC capture circuit 15 latches the count value of its free run counter as a count value $C_{frc}$.

At step S2, the preceding count value $C_{frc}'$ of the free run counter at the previous interruption routine process is read out from a specified storage location M1 of RAM 13, and the new count value $C_{frc}$ of the free run counter at the interruption routine process in this instance is stored in the storage location M1.

At step S3, a value $T_n$ representing a period at that moment of the capstan frequency pulse C-FG is calculated from an equation: $T_n = C_{frc} - C_{frc}'$.

At step S4, a value $X_{n-1}$ representing a preestimated speed of the capstan drive motor 25 which has been obtained at the previous interruption routine process is read out from a specified storage location $M_{n-1}$ of the RAM 13.

At step S5, a value $X_n$ representing a new preestimated speed of the capstan drive motor 25 is calculated by the equation given below.

$$X_n = \{(1/T_n - X_{n-1}) T_n\}/(T_n - T_x) + X_{n-1} = (1 - X_{n-1} T_n)/(T_n - T_x) + X_{n-1}$$

The initial value $X_1$ is given by the following equation.

$$X_1 = \{(1/T_1 - 1/T_0)(T_1 + T_x)\}/T_1 + 1/T_0$$

where $T_x$ is a value corresponding to a delay time between the moment when a capstan frequency pulse C-FG rises and the moment when a servomotor control signal is outputted after an arithmetic operation is performed by using values latched at the time of rise of the pulse C-FG. In this embodiment, a constant value is as Tx.

At step S6, the calculated value $X_n$ representing the preestimated speed of the capstan drive motor 25 is stored in the storage location $M_2$.

At step S7, using the preestimated speed $X_n$, a control signal $O_n$ for the capstan drive servomotor 25 is calculated by the following equation, and the calculated control signal is outputted to the drive pulse generating circuit 16.

$$O_n = f(X_n)$$

where $f(X_n)$ is a function to calculate the control output for the servomotor from the preestimated speed $X_n$ of the servomotor. This function differs for different servo loops. It is adapted to characteristics of servomotors in use, a servo gain, etc.

After step S7, the CPU 11 returns from this interruption routine to the main routine.

Figure 3:
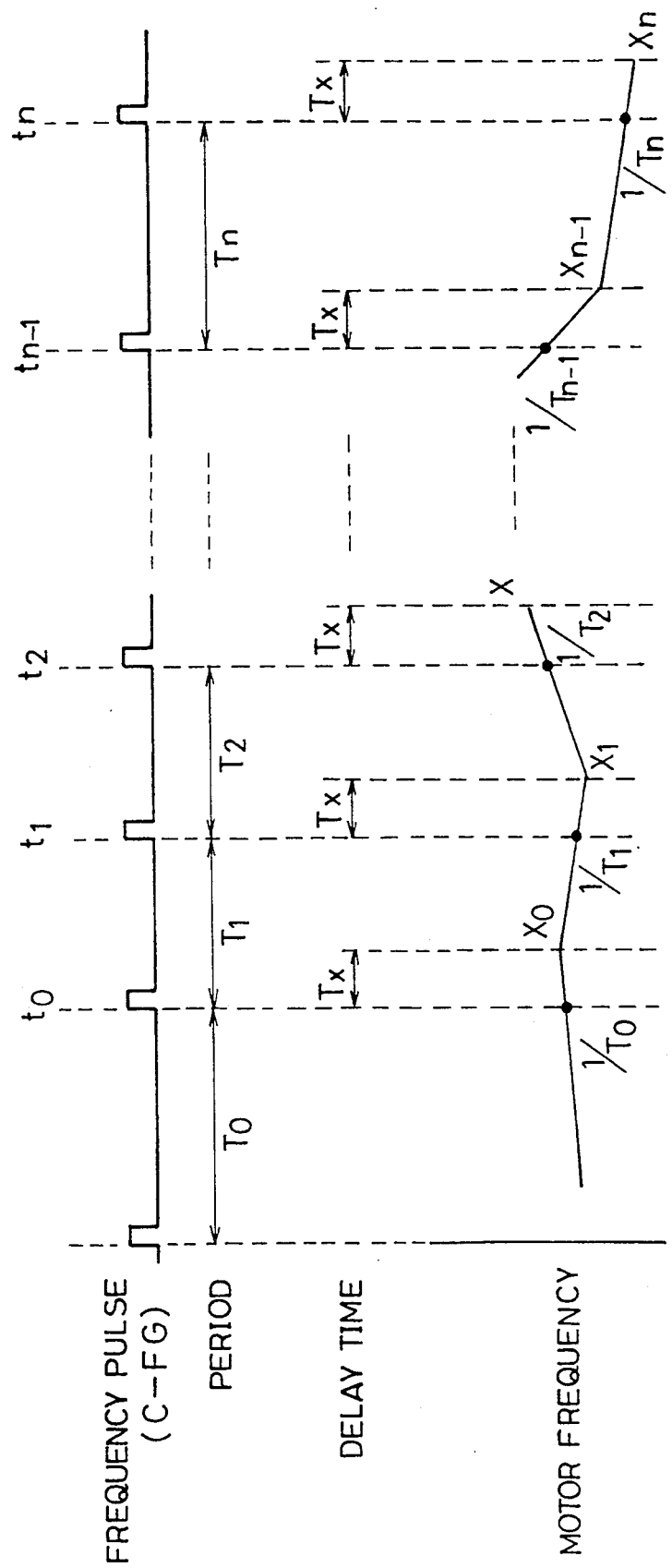
FIG. 3 is a timing chart showing the relation among values of various operations in the embodiment of FIG. 1.

FIG. 3 is a timing chart showing the relation among the capstan frequency pulse C-FG, the value $T_n$ representing the period of the pulse C-FG, delay time $T_x$, and the value $X_n$ representing the preestimated speed of the capstan drive motor 25.

The capstan frequency pulse C-FG is supplied at timings of $t_0, t_1, \ldots, t_{n-1}, t_n$. For each pulse, the interruption routine shown in FIG. 1 is executed, whereby the periods $T_0, T_1, \ldots, T_{n-1}$, and $T_n$ are calculated. Reciprocals $1/T_0, 1/T_1, \ldots, 1/T_{n-1}$, and $1/T_n$ of the $T_0, T_1, \ldots, T_{n-1}$, and $T_n$ correspond to the speeds of the capstan drive motor 25.

Those calculated speeds represent speeds at timings of $t_0, t_1, \ldots, t_{n-1}$, and $t_n$.

However, the actual time when a control signal for the capstan drive motor 25 generated on the basis of the calculated speeds is outputted is delayed by Tx from the timing $t_0, t_1, \ldots, t_{n-1}$, and $t_n$. Therefore, in this embodiment, the preestimated speed $X_n$ indicating the speed after Tx of the capstan drive motor 25 is calculated by the above-mentioned linear extrapolation formula $X_n = (1 - X_{n-1}T_n)/T_n - T_x) + X_{n-1}$.

Consequently, a servo-controlled quantity exactly corresponding to the speed $X_n$ at the time when the controlled quantity is actually outputted can be obtained, so that the servomotor's response speed is increased substantially, making it possible to perform servo control stably without occurrence of ringing.

Description has been made of servo control of the capstan drive motor 25. However, the rotating head drum drive motor 27 is also servo-controlled in the same manner.

The present invention may be applied not only to the servo control device of a VCR, but also to the servo control device of DAT or other systems.

Though the delay time $T_x$ due to the arithmetic operation is made constant in the above embodiment, it may be a variable value.

With regard to the extrapolation formula, a linear equation is used in the above embodiment, however, an extrapolation formula of quadratic or higher degree may be used.

Many widely different embodiments of the present invention may be constructed without departing from the spirit and scope of the present invention. It should be understood that the present invention is not limited to the specific embodiment described in the specification, except as defined in the appended claims.

What is claimed is:

1. A servomotor control device comprising:
   pulse generating means for generating a pulse signal having a frequency corresponding to an actual frequency of a servomotor; and
   arithmetic operation means for outputting a control signal on the basis of said pulse signal for controlling said servomotor,
   wherein said arithmetic operation means generates said control signal by implementing an extrapolation correction on the basis of a preestimated variation of a frequency of said servomotor due to a time delay between a moment when said pulse signal is generated and a moment when said control signal is applied to said servomotor, said arithmetic operation means including means for calculating said control signal $X_n$ in accordance with the following equation:

$$X_n = (1 - X_{n-1} T_n)/(T_n - T_x) + X_{n-1}$$

where $T_n$ is a value corresponding to a difference between a period of a pulse signal $t_n$ received from said pulse generating means and a period of a preceding pulse signal $t_{n-1}$ received previously from said pulse generating means, $X_{n-1}$ is a preceding control signal previously calculated by said arithmetic operation means, and $T_x$ is a value corresponding to a period of time between a moment when a pulse signal is received from said pulse generating means and a moment when a control signal is outputted from said arithmetic operation means, an initial value of $X_1$ being expressed by the following expression $$X_1 = \{(1/T_1 - 1/T_0)(T_1 + T_x)\}/T_1 + 1/T_0$$

where $T_1$ is a value corresponding to a difference between a period of pulse signal $t_1$ received from said pulse generating means at the time of said arithmetic operation means calculating said initial value of $X_1$ and a period of a pulse signal $t_0$ preceding said pulse signal $t_1$, and $T_0$ is a value corresponding to a difference between said period of said pulse signal $t_0$ and a period of a pulse signal preceding said pulse signal $t_0$.

2. The servomotor control device according to claim 1, wherein said pulse generating means comprises a pulse generator for detecting a frequency of a capstan drive motor of a DAT or VCR.

3. The servomotor control device according to claim 1, wherein said pulse generating means comprises a pulse generator for detecting a frequency of a rotating head drum drive motor of a DAT or VCR.

* * * * *

UNITED STATES PATENT AND TRADEMARK OFFICE
CERTIFICATE OF CORRECTION

PATENT NO. :   5,323,096
DATED      :   June 21, 1994
INVENTOR(S):   Toshifumi NAKAI It is certified that error appears in the above-indentified patent and that said Letters Patent is hereby corrected as shown below:

On the title page, item 54, and col. 1, line 2:

IN THE TITLE:

Please change "SERVOMATOR" to --SERVOMOTOR--.

Signed and Sealed this

Thirtieth Day of August, 1994

Attest:

BRUCE LEHMAN

Attesting Officer                Commissioner of Patents and Trademarks